Patented June 17, 1952

2,600,388

UNITED STATES PATENT OFFICE 2,600,388

METHOD OF BONDING USING HEAT SEALING PROTEIN ADHESIVES

Arthur C. Beckel and John C. Cowan, Peoria, and Paul A. Belter, Pekin, Ill., assignors to the United States of America as represented by the Secretary of Agriculture No Drawing. Application April 5, 1949, Serial No. 85,712

5 Claims. (Cl. 154—141)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to protein adhesives, and in particular to adhesives comprising the water-extractable substances from soybean material free from alcohol solubles. The invention has among its objects to provide an adhesive coating comprising this water-extractable substance and various materials bonded therewith by heat energizing the dried coatings.

Still another object of this invention is the preparation of proteinaceous adhesive coatings upon articles such as paper, wood, fabrics, metals, metal foil, regenerated cellulose sheeting and the like.

In application Serial No. 68,442, filed Dec. 31, 1948, Arthur C. Beckel and Paul A. Belter disclose a soybean protein adhesive coating, useful as a moisture-sensitive adhesive and which is also heat energizable while moist.

We have now discovered that this material has a further unique property which renders it particularly useful as a dry heat sealing adhesive.

In application Serial No. 782,941, filed October 29, 1947, now Patent No. 2,495,706, Letta I. De Voss, Arthur C. Beckel, and Paul A. Belter disclose a vegetable gel manufactured by heating an aqueous suspension of the water-extractable substance obtained from alcohol solubles free soybean material.

According to that application, the spray dried solids from the water extract may be dispersed in water and heated to temperatures of 150° F. upward to form an irreversible gel. Similarly, the aqueous extract itself may be heated to form the gel in ranges of 10 to 50 percent solids. We have discovered that aqueous suspensions of this type, when coated upon paper, wood, and other surfaces, and dried are capable of forming a strong water-resistant bond by the application of heat and mild pressure.

A small amount of moisture appears necessary to form the heat-sealed bonds according to this invention. Nevertheless, all seals which we have tested contained sufficient moisture at equilibrium with the atmosphere. For all practical purposes the seals before heat energizing were dry to the touch, non-tacky, and non-blocking. The dry adhesive coating is not hygroscopic or sensitive to ordinary atmospheric conditions of temperature or humidity. In this specification the term "dry" refers to air dry coatings, i. e., coatings that are at equilibrium with the atmosphere.

The temperature of sealing ranges from 150° to 275° F. For smooth surface contacts, such as metal-to-metal, metal-to-glass, paper-to-paper, and the like, only slight pressure is required to insure satisfactory heat sealing. In the case of porous or uneven surfaces, such as wood, leather, fabric and the like, higher pressures are necessary to achieve contact during the sealing.

The application of the adhesive coating may be accomplished by means of a 10 to 70 percent aqueous dispersion of the soybean protein substance. It may be brushed, poured, sprayed or otherwise coated on the surface, or articles to be coated may be dipped in the aqueous dispersion.

Our heat sealing process is not limited to the sealing of flat or smooth surfaces. It may be employed for bonding aggregates, such as cork granules, wood or other fibers and the like. The coating suspensions may be mixed or blended with other materials, such as starch, proteins, formaldehyde, dextrins, and resins to form air dry heat energizable adhesive coatings. In addition, any desirable filler or plasticizer may be employed.

Since the air dry coatings have the dual property of being moisture sensitive (i. e., serve as remoistening adhesives), and heat energizable, the seals may be made by first using the coating as a remoistening adhesive, as for example, in the sealing of an envelope, and subsequently allowing the seal to dry, then heat energizing the seal already formed, as for example, by running a hot iron over the envelope. This procedure is convenient when desiring to make permanent and water-resistant a seal which has already been formed. Moreover, articles prepared for permanent sealing may be bonded lightly and/or temporarily employing the remoistening property, and the temporarily bonded articles may be subsequently handled, transported, stored, and the like before permanent seals are made.

The following examples illustrate the invention.

EXAMPLE 1

The gelable material was produced from hexane extracted soybean flakes by alcohol washing the flakes and subsequently extracting with water and spray drying the extract in accordance with the disclosure in application Serial No. 782,941, previously mentioned.

The sealing adhesive was made by applying a film of an aqueous dispersion of the gel material to the various surfaces and allowing the films to dry to equilibrium with the atmosphere. The dispersions were of 48 percent solids. The samples of material were sealed in a Carver press provided with steam-heated platens. The results are summarized in the following table.

*Table I*

| Test No. | Bond | Glue line [1] | Temperature of platens | Time in assembly |
|---|---|---|---|---|
|   |   |   | °F. |   |
| I | Paper to paper | D | 212 | 2 min. |
| II | do | D | 219 | 3 min. |
| III | Paper to glass | S | 245 | 3 min. |
| IV | do | D | 248 | 3 min. |
| V | Glass to glass | D | 252 | 5 min.[2] |
| VI | Wood to wood | S | 250 | 5 min.[3] |
| VII | do | S | 250 | 5 min.[4] |
| VIII | Paper to metal | D | 250 | 3 min.[5] |
| IX | do | S | 252 | 3 min. |
| X | Paper to leather | S | 252 | 10 sec.[6] |

[1] D—double glue line, both surfaces coated; S—single glue line, one surface coated.
[2] The glue line darkened slightly with a few transparent spots, indicating some plastic flow under the conditions of the test.
[3] Pressure of 2000 lbs. per sq. in.
[4] A typical plywood application in that the center piece was coated on each side—pressure of 4000 lbs. per sq. in.
[5] Dried film flaked off where paper was not attached. Also, metal to metal because platen stuck to plate.
[6] Oil oozed out of leather and the time was shortened.

In all cases the seals were stronger than the paper or wood bonded.

EXAMPLE 2

A 50-percent dispersion, made as in the above example, was coated by brushing on two pieces of kraft paper, and the coatings allowed to air dry over night. The two sheets were then placed with the coated sides together and pressed with a moderately warm household iron. A strong water-resistant seal formed with amazing rapidity. The pieces of paper could not be torn apart without rupturing the paper.

In general the process of making the gelable material involves providing an alcohol-extracted proteinaceous soybean residue which is substantially devoid of alcohol-soluble matter, extracting a sufficient quantity of this residue with water to obtain a mixture of a proteinaceous material suspended in an aqueous solution of water-soluble constituents. The ratio of water to residue may vary over a wide range. We prefer a ratio of 3 to 10:1, by weight. After removal of fibrous, insoluble soybean material, this mixture may be dried, as by spray-drying to obtain a solid, powdery material. The mixture, or a similar water suspension of the dried material, gels upon heating. The resulting product is an irreversible gel, and it, as well as compositions comprising a substantial portion of it, retains its shape indefinitely at all temperatures to which food products are normally exposed.

The above-mentioned residue can be procured in either of two ways. The first method is to treat a proteinaceous soybean material, which may be either flakes, ground soybeans, or soybeans broken or comminuted in any other fashion, to remove the oil. This may be done by conventional procedures, such as by extraction with petroleum ether, hexane, or other similar solvent, by mechanical expulsion of the oil, and so forth. The resulting oil-free, proteinaceous soybean material is then thoroughly contacted with alcohol, such as by washing, to extract alcohol-soluble matter.

We have found that washing with alcohol gives satisfactory results when the alcohol is employed in a concentration of about from 50 percent to absolute alcohol. We prefer to wash with about 70 percent alcohol and attain improved results by repeating the wash.

The second method involves treating the soybean material, in any of the forms mentioned above, with alcohol directly to extract the oil and any other alcohol-soluble matter present. Thus a secondary washing with alcohol is unnecessary.

In both the above procedures, the use of alcohol, preferably ethyl alcohol, has the effect of removing certain constituents among which are those which act as antigelling factors and which heretofore have prevented the formation of gels from proteinaceous soybean material.

An ideal material from which to obtain the gelling product is alcohol flakes, that is, flakes from which the oil has been extracted by ethyl alcohol. Other flakes may be used, however, such as hexane-extracted flakes, flakes from which the oil has been expelled mechanically, and the like. It is necessary in every case to remove the antigelling factors by means of an alcohol wash. In the case of alcohol flakes, however, a secondary wash is not necessary since these factors have been removed along with the oil. High temperatures should be avoided during processing for removal of the oil from the flakes.

In carrying out the process, the alcohol-extracted proteinaceous soybean residue prepared as described above, is mixed with water and is allowed to stand for a period of about one-half to one hour. Thereafter the insoluble, fibrous material is separated from the aqueous phase by conventional procedure, such as filtration or other suitable methods.

The remaining aqueous phase may be evaporated, if desired, by conventional means, preferably by spray-drying, to produce the dry, solid, powdery gelling material. The aqueous phase itself, if is contains at least 10 percent solids, or a similar water suspension of the dried product, will form the gel upon being heated.

In general, the content of solids ranges from about 10 to 50 percent with respect to the water content, and the gelling temperatures range from 150° F. to boiling, the higher temperatures corresponding to the lower ranges of solids content. For the purposes of this invention the content may range up to 70 percent.

The pH may vary over a wide range, but too great acidity will prevent gelling and induce precipitation of the proteinaceous constituents. In general, the pH should be kept within the range of about from 5.0 to 9.0.

The concentration of solids should be at least about 10 percent and preferably above that in order to insure a satisfactory gel. This corresponds to about 5 percent protein, since the protein content of the solids varies from 50 to 60 percent. Higher concentration may be used as desired.

The expressions "water-extracted" and "mixing with water" signify use of ordinary water and not aqueous protein denaturants.

The following tabulated example illustrates the gelling properties of various concentrations of spray-dried solids added to water. In these data the material used was obtained by water extraction of alcohol flakes and contained about 54 percent protein. The pH of the aqueous suspension was 6.0.

| Concentration | Gelling Properties |
|---|---|
| 1 percent solids added to water | Did not gel or precipitate. |
| 2.5 percent solids added to water | Did not gel or precipitate. |
| 5.0 percent solids added to water | Close to gel, but solution evaporated ½ volume. |
| 10.0 percent solids added to water | Gel on boiling. |
| 20.0 percent solids added to water | Gel at 200° F. |
| 40.0 percent solids added to water | Gel at 180° F. |

Having thus described our invention, we claim:

1. A process of forming a water-resistant adhesive bond comprising coating the surface of material to be bonded with a 10 to 70 percent aqueous dispersion of a gelable material hereinafter defined, drying the coating to equilibrium with the atmosphere, the coating being dry to the touch, non-tacky, non-blocking, and not sensitive to ordinary atmospheric conditions of temperature or humidity, and thereafter applying heat in the temperature range of 150° to 275° F. and pressing the coated surface against another surface to bond the two together; said gelable material being the water-extracted constituents of soybean material from which ethyl alcohol soluble anti-gelling substances had been removed by extraction with ethyl alcohol.

2. Method of forming a water-resistant adhesive bond comprising subjecting contiguous articles, at least one of which is coated with an air-dry film of the water-extractable constituents of alcohol solubles free soybean material to a temperature in the range of 150° to 275° F. and sufficient pressure to insure contact between the articles, said constituents being the material obtained by extracting soybean material with alcohol to remove alcohol soluble antigelling factors, mixing the resulting oil-free gellable material with water, and removing the water insoluble material.

3. Method of claim 2 in which both the articles have been previously coated and air dried, and the contact is between contiguous coated surfaces.

4. In a method of bonding two surfaces by coating one or both of said surfaces with bonding material and applying heat and sufficient pressure to insure contact between the two surfaces, the improvement comprising employing as the bonding material an air dry film of an aqueous at least ten percent solids dispersion of a gelable material produced by treating soybean material to remove the oil and the alcohol-soluble material, extracting the residue with water, to separate the gelable material from the water insoluble portion of the residue.

5. In a method of bonding two surfaces by coating one or both of said surfaces with aqueous bonding material, permitting the material to dry, and thereafter pressing the surfaces together and applying heat to form a bond, the improvement comprising employing as the bonding material an air dry film of an aqueous at least about 48 percent solids dispersion of a gelable material produced by treating soybean material to remove the oil and the alcohol-soluble material, extracting the residue with water, to separate the gelable material from the water insoluble portion of the residue.

ARTHUR C. BECKEL.
JOHN C. COWAN.
PAUL A. BELTER.

REFERENCES CITED

The following references are of record in the file of this patent:

UNITED STATES PATENTS

| Number | Name | Date |
|---|---|---|
| 1,851,952 | Dike | Mar. 29, 1932 |
| 2,200,839 | Fleck | May 14, 1940 |
| 2,229,028 | Sturken | Jan. 21, 1941 |
| 2,421,113 | Burnet et al. | May 27, 1947 |
| 2,495,706 | Voss et al. | Jan. 31, 1950 |

OTHER REFERENCES

Industr. and Engin. Chem., "Soybean Protein," Smith and Max, July 1942, pp. 817 to 820.